US006427343B1

(12) United States Patent
Chang

(10) Patent No.: US 6,427,343 B1
(45) Date of Patent: Aug. 6, 2002

(54) PENCIL SHARPENER HAVING A PENCIL LIMITING DEVICE

(76) Inventor: Chun Yuan Chang, 5F-1, No. 81, Sec. 2, Chern Der Road, Taipei (TW), 103

( * ) Notice: Subject to any disclaimer, the term of this patent is extended or adjusted under 35 U.S.C. 154(b) by 131 days.

(21) Appl. No.: 09/585,777

(22) Filed: Jun. 5, 2000

(51) Int. Cl.[7] .................................................. B23L 23/08

(52) U.S. Cl. ............................. 30/454; 30/455; 30/457; 30/462; 144/28.5

(58) Field of Search ............................ 144/28.1, 28.11, 144/28.2; 30/454, 455, 457, 462

(56) References Cited

U.S. PATENT DOCUMENTS 1,547,092 A * 7/1925 Benton .................... 144/28.11
4,248,283 A * 2/1981 Kaye ........................... 30/454
5,167,071 A * 12/1992 Eisen .......................... 30/452
5,845,406 A * 12/1998 Luttgens .................. 144/28.11
6,301,791 B1 * 10/2001 Luttgens ...................... 30/454

* cited by examiner

*Primary Examiner*—Boyer Ashley
(74) *Attorney, Agent, or Firm*—Charles E. Baxley

(57) ABSTRACT

A pencil sharpener includes a casing secured in a housing and having a groove for receiving a pencil to be sharpened and having a cutter blade for sharpening the pencil. A device has a slide slidably received in the housing and has an extension extended from a resilient arm and engaged into the groove of the casing for determining the engagement of the pencil into the groove of the casing and for controlling the sharpening operation of the pencil. The slide may be adjusted relative to the housing for adjusting the engagement of the extension into the casing.

7 Claims, 3 Drawing Sheets

PENCIL SHARPENER HAVING A PENCIL LIMITING DEVICE

BACKGROUND OF THE INVENTION

1. Field of the Invention

The present invention relates to a sharpener, and more particularly to a pencil sharpener.

2. Description of the Prior Art

Typical pencil sharpeners comprise a casing having a groove formed therein for receiving a pencil, and having a knife blade extended inward of the groove of the casing for sharpening the pencil. The user may not know the extension of the pencil into the groove of the casing, such that the user may not realize whether the pencil has been sharpened or not. Normally, the user have to remove the pencil from the pencil sharpener from time to time during the rotating or the sharpening operation of the pencil, in order to see whether the pencil has been sharpened to the required condition.

The present invention has arisen to mitigate and/or obviate the afore-described disadvantages of the conventional pencil sharpeners.

SUMMARY OF THE INVENTION

The primary objective of the present invention is to provide a pencil sharpener including a limiting device for limiting the engagement of the pencil into the sharpener and for controlling the sharpening operation of the pencil.

In accordance with one aspect of the invention, there is provided a pencil sharpener comprising a casing including a groove formed therein for receiving a pencil to be sharpened, a cutter blade secured on the casing and extended inward of the groove of the casing for sharpening the pencil, and means for limiting an engagement of the pencil into the groove of the casing in order to control the sharpening operation of the pencil. The user may thus be easily control and determine the sharpening operation of the pencil without trial and error processes.

The limiting means includes an extension having an end engaged into the groove of the casing for determining the engagement of the pencil into the groove of the casing. A housing is further provided and includes a chamber formed therein for receiving the casing, and means for retaining the casing in the housing.

The retaining means includes at least one rib extended inward of the chamber of the housing and engaged with the casing for retaining the casing in the housing. The housing includes an orifice formed therein, the casing includes an opening formed therein and communicating with the groove of the casing and aligned with the orifice of the housing for receiving the pencil.

The housing includes a channel formed therein, the limiting means includes a slide slidably received in the channel of the housing, and includes a knob extended from the slide for moving the slide relative to the housing and for adjusting the extension relative to the casing. The slide includes an arm extended therefrom, the extension is extended from the arm.

The limiting means further includes means for securing the slide to the housing. The securing means includes at least one tooth extended from the housing and extended inward of the channel of the housing, and includes at least one projection extended from the slide and engaged with the tooth of the housing and for adjustably securing the slide to the housing and thus for adjustably extending the end of the extension inward of the groove of the casing. The end of the extension includes a notch formed therein for receiving the cutter blade and for allowing the end of the extension to be engaged into the groove of said casing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
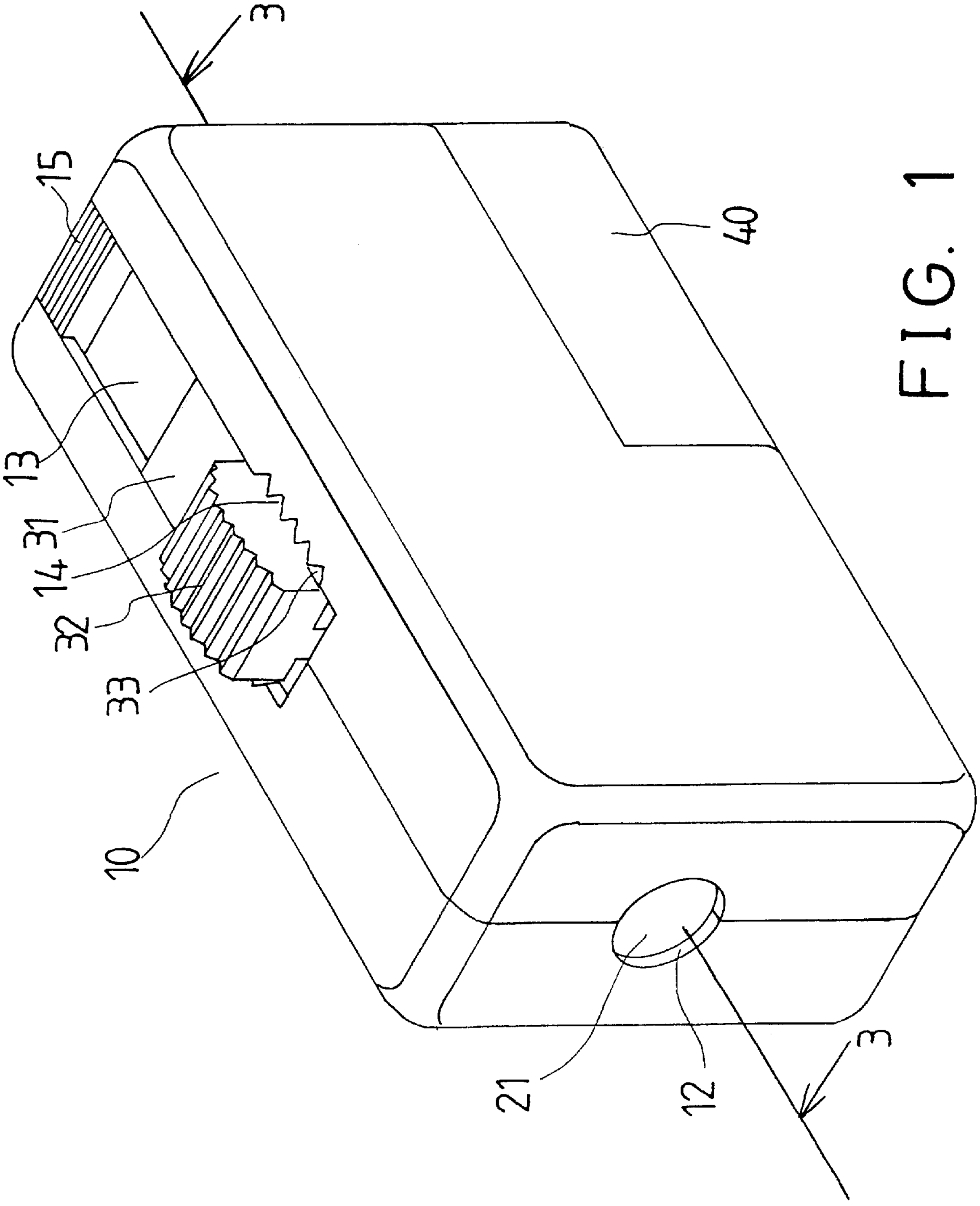
FIG. 1 is a perspective view of a pencil sharpener in accordance with the present invention.
Figure 2:
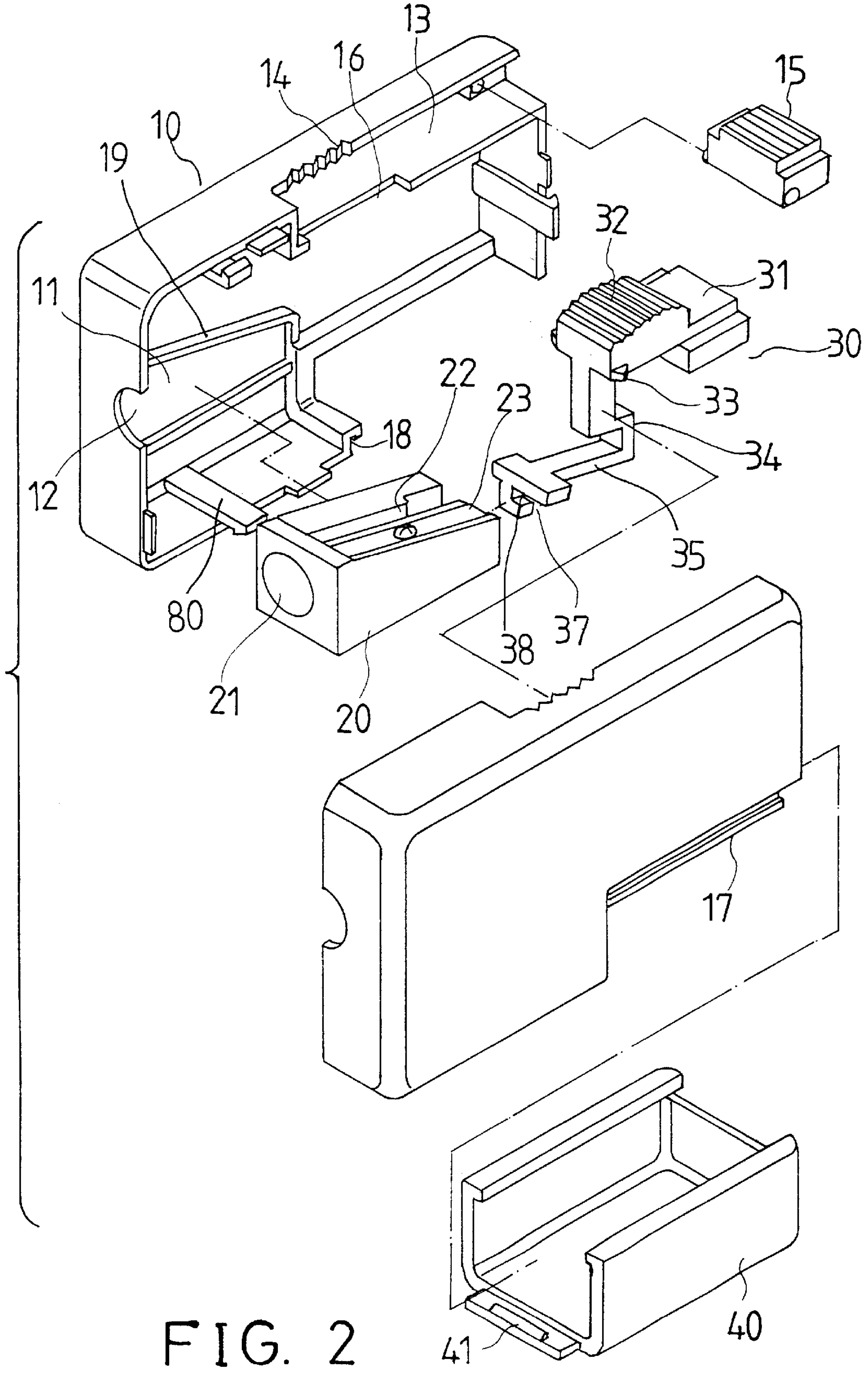
FIG. 2 is an exploded view of the pencil sharpener.
Figure 3:
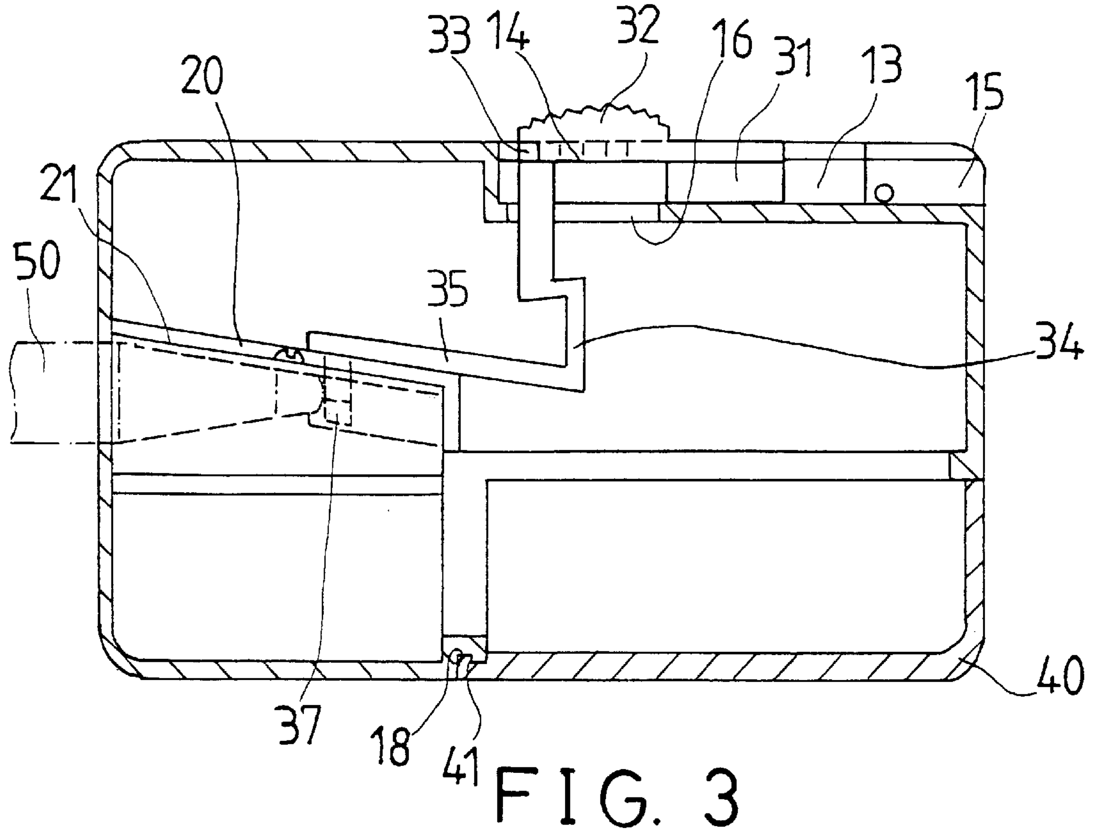
FIG. 3 is a cross sectional view taken along lines 3—3 of FIG. 1.

Referring to the drawings, and initially to FIGS. 1–3, a pencil sharpener in accordance with the present invention comprises a housing 10 including two half members secured together by such as adhesive materials or by fasteners or by latch devices 80 (FIG. 1). The housing 10 includes a chamber 11 formed therein and defined by one or more ribs 19 which are extended inward of the chamber 11 of the housing 10 for receiving a casing 20 and for retaining the casing 20 in the housing 10. The housing 10 includes an orifice 12 formed therein and aligned with the chamber 11 thereof for receiving the pencil 50 (FIGS. 3, 4) to be sharpened. The casing 20 includes an opening 21 formed therein and aligned with the orifice 12 of the housing 10 and includes a groove 22 formed therein and aligned with the opening 21 thereof for receiving the pencil 50 to be sharpened. A cutter blade 23 is secured to the casing 20 and has a cutter edge extended inward of the groove 22 of the casing 20 for sharpening the pencil 50. A holder 40 is slidably secured to the bottom portion of the housing 10 with a track device 17 and includes a catch 41 for engaging into the cavity 18 of the housing 10 and for detachably securing the holder 40 to the housing 10. The holder 40 may be used for collecting the dirt sharpened from the pencil.

The housing 10 includes a channel 13 formed therein, such as formed in the upper and rear portion thereof for slidably receiving a slide 31 of a pencil limiting device 30. A stop 15 may be secured in the rear end of the channel 13 of the housing 10 for limiting the sliding movement of the slide 31 relative to the housing 10. The slide 31 includes a knob 32 extended through the channel 13 of the housing 10 and partially extended upward beyond the housing 10 for allowing the user to move the pencil limiting device. The housing 10 includes a passage 16 formed therein and communicating with the channel 13 thereof, and includes one or more teeth 14 extended inward of the channel 13 thereof. The slide 31 includes an arm 34 extended downward therefrom and slidably received in the passage 16 of the housing 10, and includes an extension 35 extended from the bottom end of the arm 34. The extension 35 includes an end 37 extended inward of the groove 22 of the casing 20 for limiting the engagement of the pencil 50 into the casing 20 (FIGS. 3, 4) and for controlling the sharpening condition of the pencil 50. The extension 35 includes a notch 38 formed therein for receiving the cutter edge of the cutter blade 23 and for allowing the extension end 37 to be engaged into the groove 22 of the casing 20. The slide 31 includes one or more projections 33 extended therefrom for engaging with the teeth 14 of the housing 10 and for adjustably securing the slide 31 to the housing 10 at the required position.

Figure 4:
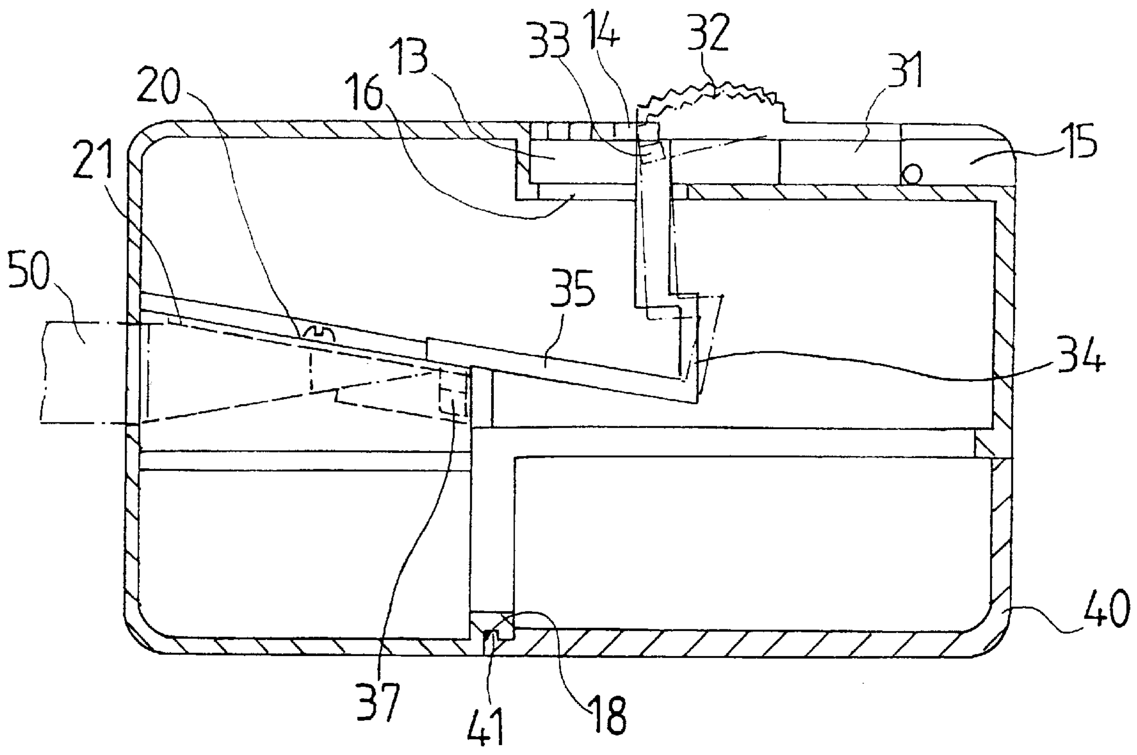
FIG. 4 is a cross sectional view similar to FIG. 3, illustrating the operation of the pencil sharpener.

As best shown in FIG. 4, the arm 34 of the pencil limiting device includes a bent structure for increasing the resilience of the arm 34 and for allowing the knob 32 to be slightly depressed inward of the channel 13 of the housing 10 in order to disengage the projections 33 of the slide 31 from the teeth 14 of the housing 10. The resilience of the arm 34 may also be used to bias the projections 33 of the slide 31 to engage with the other teeth 14 of the housing 10 in order to adjustably secure the slide 31 to the housing 10 at the required position.

In operation, as shown in FIGS. 3 and 4, the projections 33 of the slide 31 may be disengaged from the teeth 14 of the housing 10 by depressing the knob 32, and may be engaged with the other teeth 14 after the knob 32 is released. The end 37 of the extension 35 of the pencil limiting device may thus be adjusted relative to the casing 20. The engagement of the pencil 50 into the casing 20 and the sharpening operation of the pencil 50 may thus be adjusted and controlled. It is to be noted that the user may easily know whether the pencil has been sharpened to the required condition or not when the pencil 50 may no longer be engaged and pushed inward of the casing 20. The user thus need not to remove the pencil 50 outward of the casing 20 from time to time in order to see whether the pencil has been sharpened to the required condition or not.

Accordingly, the pencil sharpener in accordance with the present invention includes a limiting device for limiting the engagement of the pencil into the sharpener and for controlling the sharpening operation of the pencil.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pencil sharpener comprising:

a casing including a groove formed therein for receiving a pencil to be sharpened, a cutter blade secured on said casing and extending inward of said groove of said casing for sharpening the pencil, means for limiting an engagement of the pencil into said groove of said casing, said limiting means including an extension having an end engaged into said groove of said casing for determining the engagement of the pencil into said groove of said casing, a housing including a chamber formed therein for receiving said casing, said housing including a channel formed therein, means for retaining said casing in said housing, and said limiting means including a slide slidably received in said channel of said housing, and including a knob extended from said slide.

2. The pencil sharpener according to claim 1, wherein said retaining means includes at least one rib extended inward of said chamber of said housing and engaged with said casing for retaining said casing in said housing.

3. The pencil sharpener according to claim 1, wherein said housing includes an orifice formed therein, said casing includes an opening formed therein and communicating with said groove of said casing and aligned with said orifice of said housing for receiving the pencil.

4. The pencil sharpener according to claim 1, wherein said slide includes an arm extended therefrom, said extension is extended from said arm.

5. The pencil sharpener according to claim 1, wherein said end of said extension includes a notch formed therein for receiving said cutter blade.

6. The pencil sharpener according to claim 1, wherein said limiting means further includes means for securing said slide to said housing.

7. The pencil sharpener according to claim 6, wherein said securing means includes at least one tooth extended from said housing and extended inward of said channel of said housing, and includes at least one projection extended from said slide and engaged with said at least one tooth of said housing.

* * * * *